United States Patent
Ueno

(10) Patent No.: US 12,306,704 B2
(45) Date of Patent: *May 20, 2025

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Hiroshi Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,091

(22) Filed: Mar. 6, 2024

(65) Prior Publication Data

US 2024/0211333 A1 Jun. 27, 2024

Related U.S. Application Data

(63) Continuation of application No. 18/103,853, filed on Jan. 31, 2023, now Pat. No. 11,960,352, which is a
(Continued)

(30) Foreign Application Priority Data

Aug. 30, 2018 (JP) ................................. 2018-161523

(51) Int. Cl.
  *G06F 11/00* (2006.01)
  *B60W 50/02* (2012.01)
  *G06F 11/07* (2006.01)

(52) U.S. Cl.
  CPC ..... *G06F 11/0772* (2013.01); *B60W 50/0205* (2013.01); *G06F 11/0739* (2013.01); *G06F 11/0751* (2013.01); *B60W 2050/022* (2013.01)

(58) Field of Classification Search
  CPC .. G06F 11/0796; G06F 11/0739; G06F 11/07; G06F 11/0754; G06F 11/0784
  See application file for complete search history.

(56) References Cited

U.S. PATENT DOCUMENTS 9,481,374 B2 * 11/2016 Grewe ................ B60W 50/029
11,126,488 B2 * 9/2021 Ueno ................... G06F 11/0751
(Continued)

FOREIGN PATENT DOCUMENTS

| JP | 2006-051922 A | 2/2006 |
| JP | 2012-096618 A | 5/2012 |
| JP | 2012-096619 A | 5/2012 |

OTHER PUBLICATIONS

Feb. 18, 2021 Office Action Issued in U.S. Appl. No. 16/419,390.
(Continued)

*Primary Examiner* — Charles Ehne
(74) *Attorney, Agent, or Firm* — Oliff PLC

(57) ABSTRACT

A vehicle control device includes a controller configured to control an actuator and generate state information representing a state of the actuator, a request arbitration unit configured to arbitrate requests from a plurality of application execution units, and a request generation unit configured to generate a drive request signal to the controller. The controller includes a detection unit configured to detect whether or not the request arbitration unit is abnormal, a first transmission unit configured to transmit the state information to the request arbitration unit, and a second transmission unit configured to, when the detection unit detects that the request arbitration unit is abnormal, transmit the state information to the application execution units such that the state information does not pass through the request arbitration unit.

3 Claims, 3 Drawing Sheets

Related U.S. Application Data continuation of application No. 17/410,392, filed on Aug. 24, 2021, now Pat. No. 11,630,713, which is a continuation of application No. 16/419,390, filed on May 22, 2019, now Pat. No. 11,126,488.

(56) References Cited

U.S. PATENT DOCUMENTS

| | | |
|---|---|---|
| 2005/0283298 A1 | 12/2005 | Ochi et al. |
| 2006/0015231 A1 | 1/2006 | Yoshimura et al. |
| 2009/0038876 A1 | 2/2009 | Ito et al. |
| 2009/0055685 A1 | 2/2009 | Mochida et al. |
| 2012/0109414 A1 | 5/2012 | Kumabe et al. |
| 2012/0109460 A1 | 5/2012 | Tokimasa et al. |
| 2014/0249721 A1* | 9/2014 | Schindler .............. B60W 10/04 701/41 |
| 2017/0254325 A1 | 9/2017 | Tajima et al. |
| 2020/0023833 A1* | 1/2020 | Martin .................. B60W 30/06 |
| 2020/0073747 A1 | 3/2020 | Ueno |

OTHER PUBLICATIONS

May 25, 2021 Notice of Allowance Issued in U.S. Appl. No. 16/419,390.
Oct. 14, 2022 Office Action Issued In U.S. Appl. No. 17/410,392.
Jan. 31, 2023 Notice of Allowance Issued in U.S. Appl. No. 17/410,392.
Jul. 3, 2023 Office Action Issued in U.S. Appl. No. 18/103,853.
Dec. 18, 2023 Notice of Allowance issued in U.S. Appl. No. 18/103,853.
U.S. Appl. No. 16/419,390, filed May 22, 2019 in the name of Hiroshi Ueno.

* cited by examiner

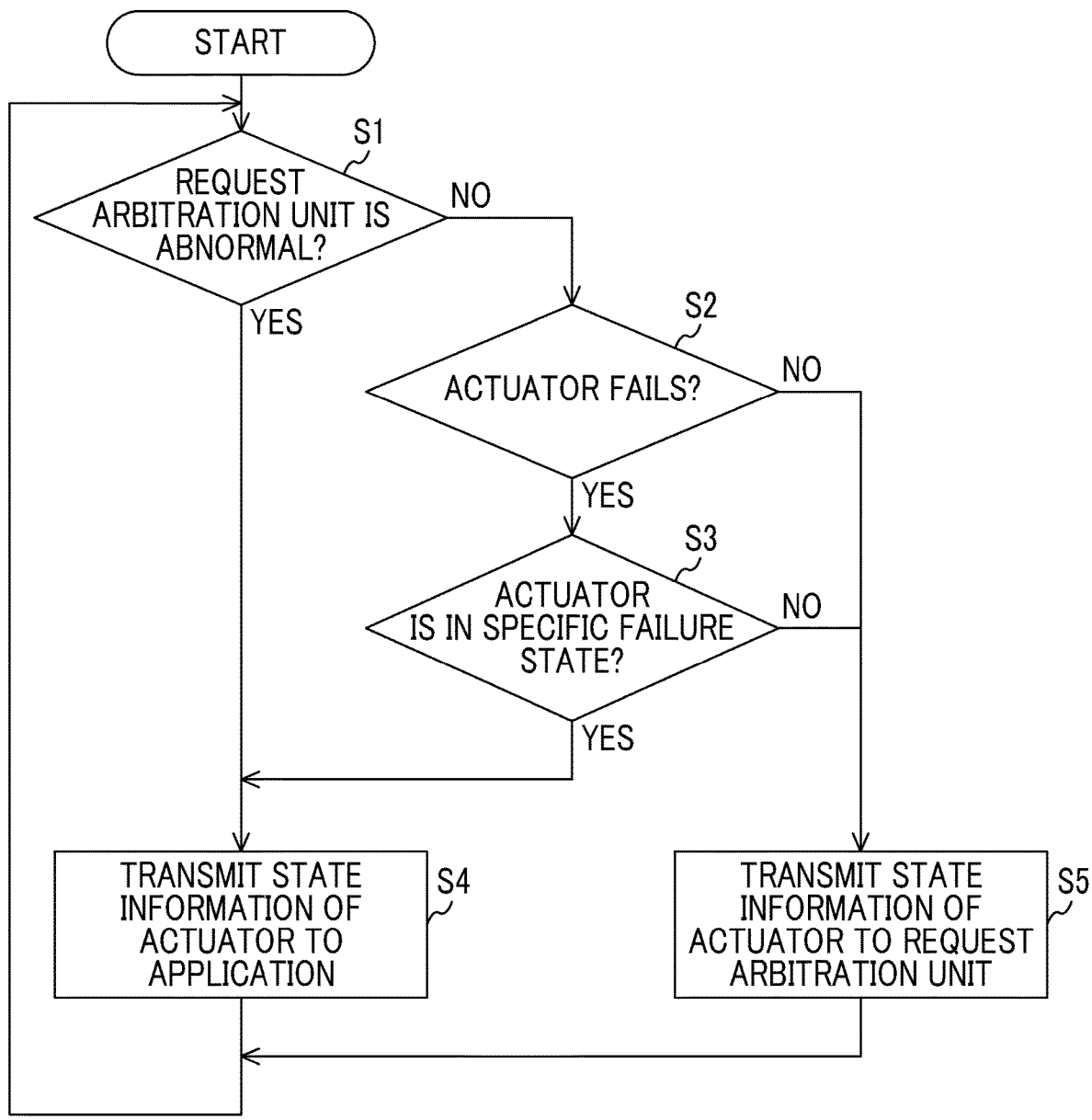

VEHICLE CONTROL DEVICE AND VEHICLE CONTROL METHOD

This Application is a Continuation of U.S. application Ser. No. 18/103,853 filed Jan. 31, 2023, which is a Continuation of application Ser. No. 17/410,392 filed Aug. 24, 2021, which is a Continuation of application Ser. No. 16/419,390 filed May 22, 2019 (now U.S. Pat. No. 11,126,488 issued on Sep. 21, 2021), which in turn claims priority to Japanese Application No. 2018-161523 filed Aug. 30, 2018. The entire disclosures of the prior applications are hereby incorporated by reference herein their entirety.

BACKGROUND

1. Technical Field

The present disclosure relates to a vehicle control device and a vehicle control method that control movement of a vehicle.

2. Description of Related Art

Japanese Unexamined Patent Application Publication No. 2012-096619 (JP 2012-096619 A) describes a vehicle lateral movement control system that controls lateral movement of a vehicle by driving actuators respectively provided in a front steering, a rear steering, and a brake. In the system described in JP 2012-096619 A, availability representing a controllable range of each actuator is acquired, an F/F request value for feedforward control of each actuator and an F/B request value for feedback control of each actuator are calculated using the acquired availability, and a mechanism to be a control target and a control amount to be finally generated in the mechanism are decided based on the calculated F/F request value and F/B request value.

SUMMARY

In recent years, with an increase in the number of driving assistance functions to be mounted in the vehicle, processing that is executed by the actuator on requests from a plurality of applications becomes complicated. Accordingly, a system configuration in which an arbitration function unit configured to relay transmission and reception of signals between a plurality of applications and a plurality of actuators and arbitrate the requests from the applications is provided in the vehicle, and a state of each actuator is fed back to each application through the arbitration function unit is considered.

However, in the system configuration, when the arbitration function unit fails, it is not possible to feed back the state of each actuator to the application.

For this reason, the disclosure provides a vehicle control device and a vehicle control method capable of reliably feeding back a state of an actuator to application execution units that implement driving assistance functions.

A first aspect of the disclosure relates to a vehicle control device. The vehicle control device includes a controller, a request arbitration unit, and a request generation unit. The controller is configured to control an actuator and generate state information representing a state of the actuator. The actuator is configured to operate a vehicle, based on requests from a plurality of application execution units configured to control movement of the vehicle. The request arbitration unit is configured to receive request signals from the application execution units and arbitrate the requests from the application execution units based on the received request signals. The request generation unit is configured to generate a drive request signal to the controller based on an arbitration result of the request arbitration unit. The request arbitration unit includes a state information receiver and a state information output unit. The state information receiver is configured to receive the state information from the controller. The state information output unit is configured to output the state information received by the state information receiver to the application execution units. The controller includes a detection unit, a first transmission unit, and a second transmission unit. The detection unit is configured to detect whether or not the request arbitration unit is abnormal. The first transmission unit is configured to transmit the state information to the request arbitration unit. The second transmission unit is configured to, when the detection unit detects that the request arbitration unit is abnormal, transmit the state information to the application execution units such that the state information does not pass through the request arbitration unit.

According to the first aspect of the disclosure, it is possible to reliably feed back the state information of the actuator to the application execution units regardless of an operation state of the request arbitration unit.

In the vehicle control device according to the first aspect, when the controller determines that the actuator is in a specific failure state, the second transmission unit may transmit the state information to the application execution units such that the state information does not pass through the request arbitration unit.

According to the first aspect of the disclosure, when the specific failure state occurs in the actuator, it is possible to promptly feed back the state information of the actuator to the application execution units, and to suppress signal delay.

In the vehicle control device according to the first aspect, when the controller determines that the actuator is not in a specific failure state, the first transmission unit may transmit the state information to the request arbitration unit.

A second aspect of the disclosure relates to a vehicle control method. The vehicle control method includes controlling an actuator and generating state information representing a state of the actuator. The actuator is configured to operate a vehicle, based on requests from a plurality of application execution units configured to control movement of the vehicle. The vehicle control method includes detecting whether or not a request arbitration unit is abnormal, the request arbitration unit being configured to receive request signals from the application execution units and arbitrate requests from the application execution units based on the received request signals, when detection is made that the request arbitration unit is abnormal, transmitting the state information representing the state of the actuator to the application execution units such that the state information does not pass through the request arbitration unit, and when detection is made that the request arbitration unit is not abnormal, transmitting the state information representing the state of the actuator to the request arbitration unit.

According to the aspects of the disclosure, it is possible to provide a vehicle control device and a vehicle control method capable of reliably feeding back a state of an actuator to application execution units that implement driving assistance functions.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a flowchart showing control processing that is executed by the controller shown in FIG. 1.

DETAILED DESCRIPTION OF EMBODIMENTS

Outline

The vehicle control device according to the first aspect of the disclosure includes the request arbitration unit configured to arbitrate the requests from the application execution units between the application execution units configured to implement driving assistance functions and the controller configured to control the actuator. The controller configured to control the actuator feeds back information indicating the state of the actuator to the application execution units through the request arbitration unit when the request arbitration unit operates normally, and directly feeds back information indicating the state of the actuator to the application execution units when the request arbitration unit is abnormal. Accordingly, it is possible to reliably feed back the state of the actuator to the application execution units that implement the driving assistance functions, regardless of the operation state of the request arbitration unit.

Embodiment

Configuration

Figure 1:
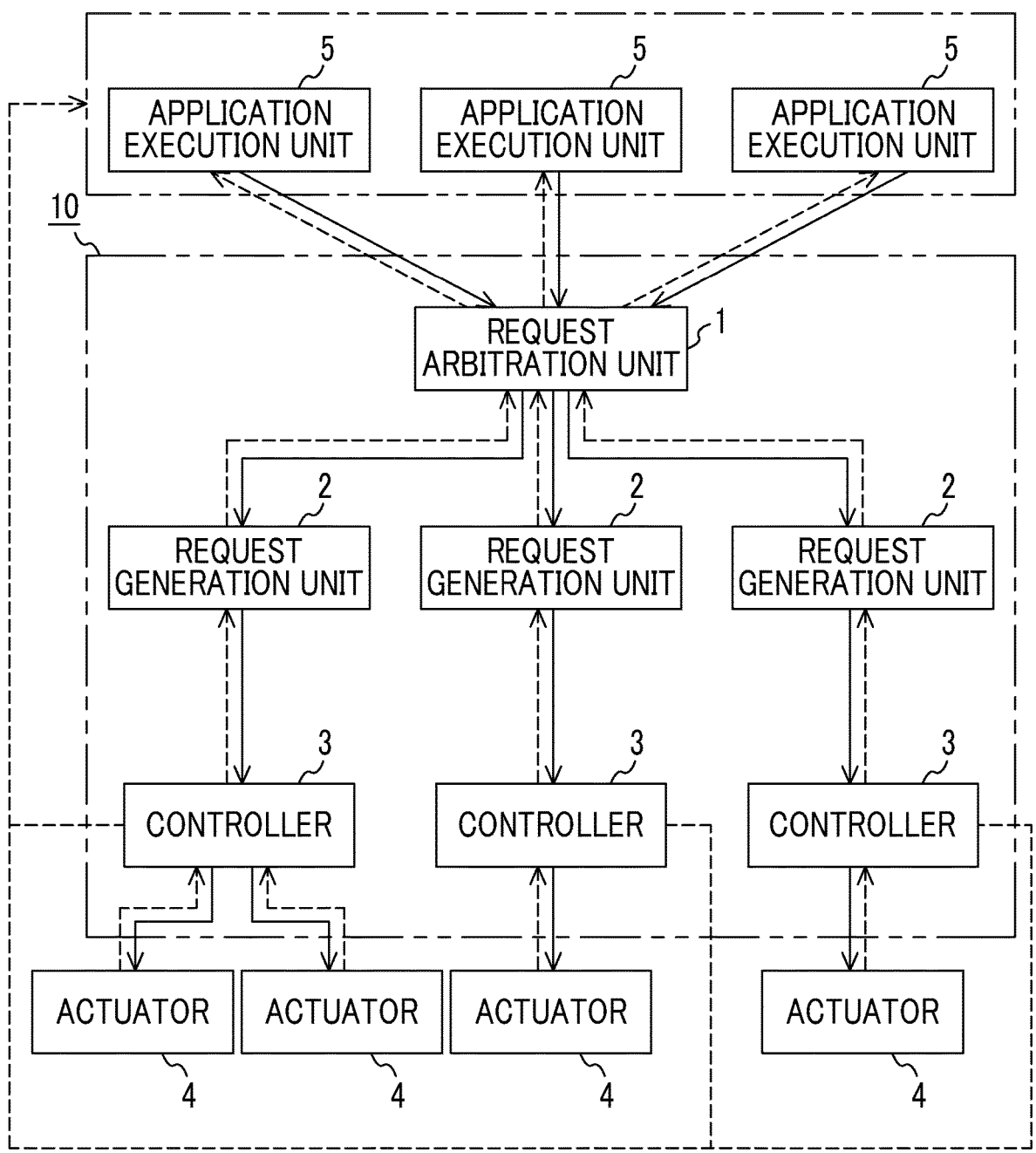
FIG. 1 is a functional block diagram of a vehicle control device according to an embodiment.

FIG. 1 is a functional block diagram of a vehicle control device according to the embodiment. In FIG. 1, solid arrows represent transmission paths of request signals from a plurality of application execution units 5 to actuators 4, and broken arrows represent feedback paths of signals from the actuators 4 to the application execution units 5.

A vehicle control device 10 is a device that controls the actuators 4 in the vehicle based on requests from the application execution units 5. The application execution units 5 are devices that execute applications for implementing driving assistance functions of the vehicle, such as autonomous driving, automatic parking, adaptive cruise control, lane keeping assistance, and collision reduction braking, and are typically implemented by electronic control units (ECUs). The application execution units 5 May execute applications simultaneously according to driving assistance functions to be used. In FIG. 1, for simplification of description, although three application execution units 5 are shown, the number of application execution units 5 that implement the driving assistance functions is not limited, and two or less or four or more application execution units 5 May be mounted in the vehicle. The application execution units 5 output request signals for operating the actuators 4 to a request arbitration unit 1 described below. The actuators 4 are drive mechanisms for operating a powertrain (referred to as a drive train), a brake device, a steering device, and the like, and are controlled by controllers 3 described below.

The vehicle control device 10 includes the request arbitration unit 1, request generation units 2, and the controllers 3.

The request arbitration unit 1 receives the request signals output from the application execution units 5 and selects one request signal from among the received request signals based on a predetermined selection criterion, thereby arbitrating the requests from the application execution units 5.

Each request generation unit 2 generates drive requests to the actuators 4 based on an arbitration result of the request arbitration unit 1, that is, the request signal selected by the request arbitration unit 1 and outputs the generated drive requests to the controller 3.

Each controller 3 is an ECU that controls the actuators 4. In the example of FIG. 1, although one controller 3 controls one or two actuators 4, the number of actuators to be controlled by the controller 3 May be three or more.

The request arbitration unit 1, the request generation units 2, the controllers 3, the actuators 4, and the application execution units 5 are connected to perform communication through a communication network, and as shown in FIG. 1, as a feedback path of a signal from the actuator 4 to the application execution unit 5, a first feedback path along which the signal is transmitted to the application execution unit 5 by way of the request arbitration unit 1, and a second feedback path along which the signal is transmitted directly to the application execution unit 5 not by way of the request arbitration unit 1 are provided. Details of the two feedback paths will be described below. A communication network that connects the actuators 4 and the application execution units 5 through the request arbitration unit 1 and a communication network that directly connects the actuators 4 and the application execution units 5 May be the same or different.

In the example of FIG. 1, although an example where the vehicle control device 10 includes three request generation units 2 and three controllers 3 has been described, the number of request generation units 2 and the number of controllers 3 are not limited thereto.

Hereinafter, the detailed configurations of the request arbitration unit 1 and the controller 3 will be described referring to FIGS. 2 and 3.

Figure 2:
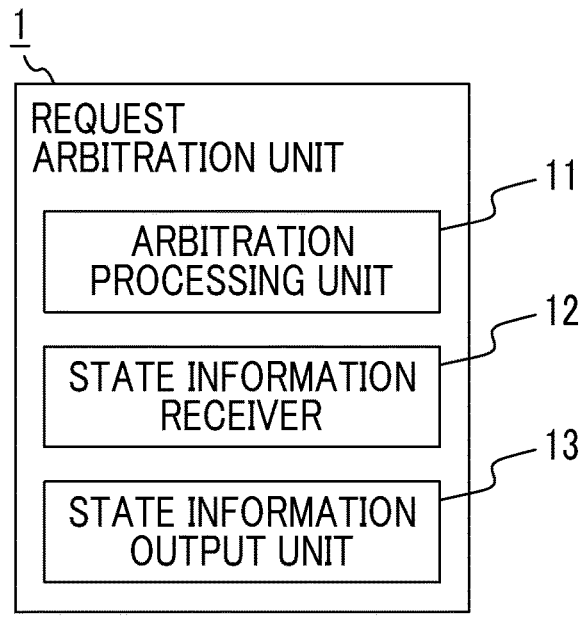
FIG. 2 is a functional block diagram of a request arbitration unit shown in FIG. 1.

FIG. 2 is a functional block diagram of the request arbitration unit shown in FIG. 1.

The request arbitration unit 1 includes an arbitration processing unit 11, a state information receiver 12, and a state information output unit 13.

The arbitration processing unit 11 receives the request signals from the application execution units 5 and executes arbitration processing, that is, processing for selecting one request signal from among the received request signals.

The state information receiver 12 receives state information representing a state of the actuator 4 from the controller 3. The state information is information representing whether the actuator 4 is normal or fails, and is acquired or generated by the controller 3 that controls the actuator 4. When the actuator 4 fails, the state information includes information representing a failure mode of the actuator 4, that is, a failure state into which the actuator 4 is brought. When the failure mode of the actuator 4 is included in the state information, the application execution unit 5 that receives the state information can distinguish between a drive request that can give an instruction to the actuator 4 in the failure state and a drive request that cannot give an instruction to the actuator 4.

The state information output unit 13 outputs the state information received by the state information receiver 12 to the application execution unit 5, thereby performing feedback of the state of the actuator 4.

Figure 3:
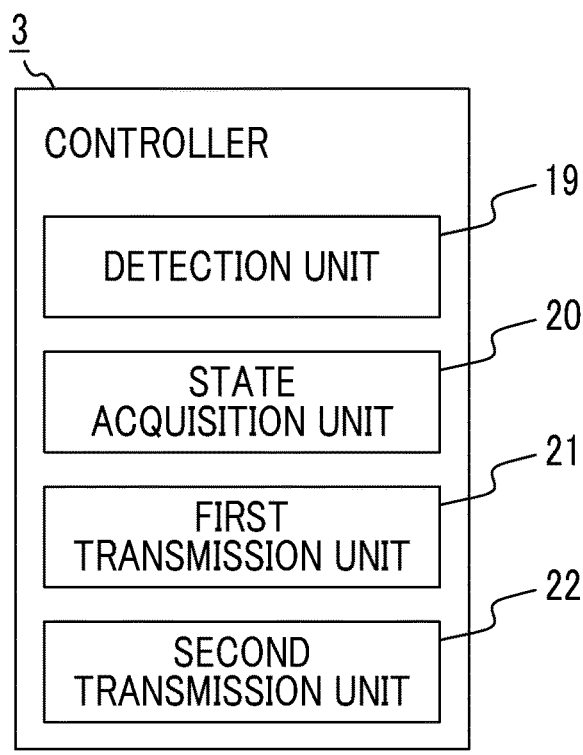
FIG. 3 is a functional block diagram of a controller shown in FIG. 1.

FIG. 3 is a functional block diagram of the controller shown in FIG. 1.

Each of the controllers 3 includes a detection unit 19, a state acquisition unit 20, a first transmission unit 21, and a second transmission unit 22.

The detection unit 19 detects whether or not the request arbitration unit 1 is abnormal. A determination method of the detection unit 19 regarding an abnormality in the request arbitration unit 1 is not particularly limited, and for example, an abnormality may be determined when information representing that the request arbitration unit 1 is abnormal is received from the request arbitration unit 1, an abnormality may be determined when the request signal or a response signal from the request arbitration unit 1 cannot be detected for a predetermined time, or an abnormality may be determined when the drive request received from the request generation unit 2 is not normal.

The state acquisition unit 20 detects the state of the actuator 4 and generates the state information representing the state of the actuator 4. For example, the state acquisition unit 20 determines whether or not the state of the actuator 4 is normal based on a response signal output from the actuator 4 in response to a drive signal output to the actuator 4 or output of the actuator 4 or sensors provided near the actuator 4, and when determination is made that the actuator 4 fails, specifies a failure state (failure mode). The state acquisition unit 20 generates the state information including a determination result of the state of the actuator 4 and the specified failure mode.

The first transmission unit 21 transmits the state information generated by the state acquisition unit 20 to the request arbitration unit 1. The state information transmitted to the request arbitration unit 1 by the first transmission unit 21 is output from the state information output unit 13 of the request arbitration unit 1 to the application execution unit 5. A path along which the state information is transmitted from the first transmission unit 21 to the application execution unit 5 by way of the request arbitration unit 1 corresponds to the above-described first feedback path.

When the detection unit 19 determines that the request arbitration unit 1 is abnormal or when determination is made that the actuator 4 is in a specific failure state, the second transmission unit 22 transmits the state information generated by the state acquisition unit 20 to the application execution unit 5 such that the state information does not pass through the request arbitration unit 1. The specific failure state of the actuator 4 refers to a state in which failure to such a degree as needed for prompt transition of the vehicle to a safe state occurs. A path along which the state information is transmitted from the second transmission unit 22 to the application execution unit 5 not by way of the request arbitration unit 1 corresponds to the above-described second feedback path.

Control Processing

FIG. 4 is a flowchart showing control processing that is executed by the controller shown in FIG. 1. The control processing of FIG. 4 is started when a start switch of the vehicle is on, and is repeatedly executed until the operation of the vehicle is off.

Step S1: The detection unit 19 determines whether or not the request arbitration unit 1 is abnormal. When the determination of Step S1 is made to be YES, the process progresses to Step S4, and otherwise, the process progresses to Step S2.

Step S2: The state acquisition unit 20 determines whether or not the actuator 4 fails. When the determination of Step S2 is made to be YES, the process progresses to Step S3, and otherwise, the process progresses to Step S5.

Step S3: The state acquisition unit 20 determines whether or not the actuator 4 is in the specific failure state. When the determination of Step S3 is made to be YES, the process progresses to Step S4, and otherwise, the process progresses to Step S5.

Step S4: The second transmission unit 22 directly transmits the state information of the actuator 4 to the application execution unit 5. Thereafter, the process progresses to Step S1.

Step S5: The first transmission unit 21 transmits the state information of the actuator 4 to the request arbitration unit 1. Thereafter, the process progresses to Step S1. When the state information receiver 12 receives the state information transmitted from the first transmission unit 21, the request arbitration unit 1 outputs the state information received by the state information output unit 13 to the application execution unit 5.

Effects and the Like

In the vehicle control device 10 according to the first aspect of the disclosure, the request arbitration unit 1 is provided between the application execution units 5 that operates the actuators 4 to implement the driving assistance functions and the controllers 3 of the actuators 4. The request arbitration unit 1 has a function of relaying transmission and reception of the signals between the application execution units 5 and the controllers 3, and arbitrating the requests from the application execution units 5. The request arbitration unit 1 is provided, whereby, even though the number of application execution units 5 that implement the driving assistance functions increases, it is possible to restrain control inference to the actuators 4, and to suppress complication of the signal paths between the application execution units 5 and the actuators 4.

Note that, in a configuration in which transmission and reception of all signals between the application execution units 5 and the actuators 4 are performed by way of the request arbitration unit 1, when an abnormality, such as failure, occurs in the request arbitration unit 1, it is not possible to feed back the state information of the actuator 4 to the application execution unit 5, and controllability may be deteriorated. When failure to such a degree as needed for transition of the vehicle to a safe state occurs in the actuator 4, it is desirable to transmit the state information of the actuator 4 to the application execution unit 5 without delay such that the vehicle can be quickly controlled to the safe state. Although it is considered that the state information of the actuator 4 is constantly directly transmitted to the application execution unit 5, in this case, an increase in load on a communication infrastructure is caused by signals from many actuators 4 mounted in the vehicle.

In the vehicle control device 10 according to the first aspect of the disclosure, during a normal time, the state information of the actuator 4 is transmitted from the first transmission unit 21 to the application execution unit 5 through the request arbitration unit 1. However, when determination is made that the request arbitration unit 1 is abnormal or when determination is made that the actuator 4 is in the specific failure state, the second transmission unit 22 directly transmits the state information from the actuator 4 to the application execution unit 5 such that the state information does not pass through the request arbitration unit 1. According to the first aspect of the disclosure, even though an abnormality occurs in the request arbitration unit 1, it is possible to reliably feed back of the state information of the actuator 4 to the application execution unit 5. When the actuator 4 is brought into the specific failure state to such a degree as needed for quick transition to the safe state, the state information of the actuator 4 is directly transmitted to the application execution unit 5 such that the state information of the actuator 4 does not pass through the request arbitration unit 1, whereby it is possible to avoid delay of signal transmission. Since the direct feedback of the state information from the actuator 4 to the application execution unit 5 is limited as being performed under a specific condition, it is possible to minimize an increase in load on the communication infrastructure.

Other Modification Examples

In the first aspect, although, when detection is made that the actuator 4 is in the specific failure state, the second transmission unit 22 directly feeds back the state information to the application execution unit 5, when the request arbitration unit 1 is not abnormal, similarly to the normal time, the first transmission unit 21 May feed back the state information to the application execution unit 5 by way of the request arbitration unit 1. Note that, as in the first aspect, even though detection is made that the actuator 4 is in the specific failure state, it is desirable that the second transmission unit 22 directly feeds back the state information to the application execution unit 5 since it is possible to further suppress delay of transmission of the state information.

The disclosure can be used as a vehicle control device that controls a vehicle mounted with a driving assistance function.

What is claimed is:

1. A control system mounted on a vehicle comprising:
a request arbitration unit configured to receive requests from application execution units that implement driving assistance functions of the vehicle, the request arbitration unit being configured to arbitrate the requests; and
a controller configured to control an actuator that operates the vehicle based on an arbitration result of the request arbitration unit, wherein
when the controller determines that the actuator is not in a specific failure state, the controller is configured to output the state information to the application execution units by way of the request arbitration unit, and
when the controller determines that the actuator is in the specific failure state, the controller is configured to output the state information to the application execution units such that the state information does not pass through the request arbitration unit.

2. The control system according to claim 1, wherein when the controller determines that the actuator fails and the actuator is not in a specific failure state, the controller is configured to output the state information to the application execution units by way of the request arbitration unit.

3. The control system according to claim 1, wherein when the controller determines that the actuator does not fail, the controller is configured to output the state information to the application execution units by way of the request arbitration unit.

* * * * *